United States Patent Office 3,658,767
Patented Apr. 25, 1972

3,658,767
PRODUCTION OF α,α-DISUBSTITUTED
β-PROPIOLACTONE POLYMERS
Yukio Shimosaka, Sumimichi Ueda, and Shigeru Nakajima Okayama, Japan, assignors to Japan Exlan Company Limited, Osaka, Japan
No Drawing. Filed Mar. 6, 1970, Ser. No. 17,307
Claims priority, application Japan, Mar. 6, 1969, 44/17,405
Int. Cl. C08g 17/017
U.S. Cl. 260—78.3 R                    8 Claims

ABSTRACT OF THE DISCLOSURE

This invention relates to a process for producing α,α-disubstituted-β-propiolactone polymers and more particularly to a process for producing at a high yield an α,α-disubstituted-β-propiolactone polymer having a high molecular weight by conducting the polymerization in the presence of a catalyst selected from phosphonium-ylide compounds having the following bonding form (I):

$$\left[ \begin{array}{c} \diagdown \\ \diagup \end{array} P^\oplus - C^\ominus - \overset{O}{\overset{\|}{C}} - \right] \quad (I)$$

It is known to polymerize β-propiolactones in the presence of an anionic catalyst. As anionic polymerization catalysts for β-propiolactones, there are already known alkali metal or alkaline earth metal hydroxides such as NaOH, KOH and Ca(OH)$_2$; alcoholates such as sodium methylate and potassium ethylate; amines such as dimethylamine, diethylamine, triethylamine, pyridine and triethylenediamine (French Pat. No. 1,231,163) and carboxylic acid metal salts such as potassium acetate and sodium acetate. Further there are also known, as the catalyst, quaternary ammonium salt; phosphine and quaternary phosphonium salt (French Pat. No. 1,491,781); sulfides, sulfoxides and sulfonium salts (British Pat. No. 1,096, 899); organic metal compounds (French Pat. No. 1,487,200) such as phenyl lithium, butylpotassium, diethylzinc, triethylaluminum and ethylzinc iodide; and metals of Group Ia, Periodic Table, such as Na and K (Japanese patent publication No. 10,156/1968). However, most of these anionic polymerization catalysts are high in the hygroscopicity so that there is required very careful handling when they are to be used for the polymerization of β-propiolactone. Further, the moisture brought into the reaction system together with such catalyst has undesirable influences on the polymerizing reaction such as reduction in the polymerization reaction velocity and also in the polymerization degree. Thus they are not fully satisfactory as polymerization catalysts.

We have found that compounds having a bond or linkage quite different from those in the above mentioned known catalysts, that is, particular phosphonium-ylide compounds are very excellent polymerization catalysts in the polymerization of α,α-disubstituted-β-propiolactones.

An object of the present invention is to produce at a high yield an α,α-disubstituted-β-propiolactone polymer of a high molecular weight by using a phosphonium-ylide compound as a polymerization catalyst.

Other objects of the present invention will become apparent from the following description.

The above mentioned objects of the present invention are attained by using, as a polymerization catalyst, a phosphonium-ylide compound having the following bonding form (I):

$$\left[ \begin{array}{c} \diagdown \\ \diagup \end{array} P^\oplus - C^\ominus - \overset{O}{\overset{\|}{C}} - \right] \quad (I)$$

in the ring-opening polymerization of an α,α-disubstituted-β-propiolactone.

When an α,α-disubstituted-β-propiolactone is ring-opening polymerized in the presence of a phosphonium-ylide compound having the above mentioned bond or linkage form (I), the polymerization velocity becomes very high and a polymer of a high molecular weight is obtained at a high yield.

Typical phosphonium-ylide compounds having the bond form (I) to be used as catalysts in the process of the present invention are represented by the following general formula:

$$\begin{array}{c} R \diagdown \\ R - P^\oplus - C^\ominus - \overset{O}{\overset{\|}{C}} - R_2 \\ R \diagup \quad \overset{|}{R_1} \end{array}$$

wherein R is an alkyl group of 1 to 6 carbon atoms such as methyl, ethyl or propyl group or phenyl, substituted phenyl, benzyl or substituted benzyl group; R$_1$ is a hydrogen atom, an alkyl group of 1 to 6 carbon atoms, a benzyl, substituted benzyl, phenyl, substituted phenyl, benzoyl or substituted benzoyl group, a carboalkyl group of 1 to 6 carbon atoms or a carboalkoxy group of 1 to 6 carbon atoms, and R$_2$ is a hydrogen atom, an alkyl group of 1 to 6 carbon atoms, a phenyl or substituted phenyl group or an alkoxy group of 1 to 6 carbon atoms.

More particular examples of the compounds represented by the above formula are (1) triphenyl-phosphonium phenacylide, (2) triphenyl-phosphonium acetylmethylide, (3) triphenylphosphonium dibenzoylmethylide, (4) triphenyl-phosphonium carboethoxymethylide, (5) triphenyl - phosphonium methylbenzoylmethylide, (6) formylmethylene triphenyl-phosphorane, (7) tributyl-phosphonium phenacylide and (8) tributyl-phosphonium acetylmethylide, having respectively the below indicated rational formulae:

(1)
$$(Ph)_3P^\oplus - C^\ominus - \overset{O}{\overset{\|}{C}} - Ph$$
$$\overset{|}{H}$$

(2)
$$(Ph)_3P^\oplus - C^\ominus - \overset{O}{\overset{\|}{C}} - CH_3$$
$$\overset{|}{H}$$

(3)
$$(Ph)_3P^\oplus - C^\ominus - \overset{O}{\overset{\|}{C}} - Ph$$
$$\overset{|}{\underset{|}{C=O}}$$
$$Ph$$

(4)
$$(Ph)_3P^\oplus - C^\ominus - \overset{O}{\overset{\|}{C}} - O - C_2H_5$$
$$\overset{|}{H}$$

(5)
$$(Ph)_3P^\oplus - C^\ominus - \overset{O}{\overset{\|}{C}} - Ph$$
$$\overset{|}{CH_3}$$

(6)
$$(Ph)_3P^\oplus - C^\ominus - \overset{O}{\overset{\|}{C}} - H$$
$$\overset{|}{H}$$

(7)
$$(Bu)_3P^\oplus - C^\ominus - \overset{O}{\overset{\|}{C}} - Ph$$
$$\overset{|}{H}$$

(8)
$$(Bu)_3P^\oplus - C^\ominus - \overset{O}{\overset{\|}{C}} - CH_3$$
$$\overset{|}{H}$$

wherein Ph represents a phenyl group and Bu represents a n-butyl group.

The substituted phenyl group, substituted benzyl group or substituted benzoyl group in the above described typical phosphonium-ylide compounds means respectively a phenyl, benzyl or benzoyl group substituted with substituent(s) having no undesirable influence on the polymerization reaction of α,α-disubstituted-β-propiolactones, for example, such inert substituent as halogen, nitro group, alkyl group of 1 to 6 carbon atoms, carboalkyl group of 1 to 6 carbon atoms or alkoxy group of 1 to 6 carbon atoms.

The phosphonium-ylide to be used in the present invention may be prepared by reacting a proper base (for example, an aqueous solution of NaOH or a mixture of tetrahydrofuran and sodium hydride) with phosphonium bromide which is obtained, in an ordinary manner, by bromination of an active methylene compound corresponding to

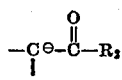

in said ylide and then reacting the resulting bromide with a phosphine. The reaction formula is shown in the following:

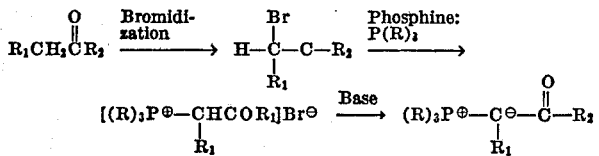

According to page 276 of Organic Reactions, vol. 14 (John Wiley and Sons, Inc. 1965), the thus obtained phosphonium-ylide compound is considered to be a resonance hybrid of the below mentioned three terminal structural formulae:

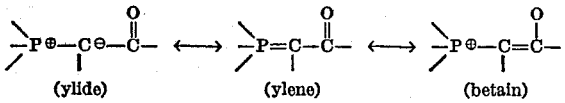

The phosphonium-ylide compound to be used in the present invention is also naturally presumed to take the above mentioned resonance structure. However, in the present invention, for convenience sake, it is represented by the structural formula of the ylide type.

It is preferable that the phosphonium-ylide is used in an amount of 0.005 to 10 mol percent or more preferably 0.05 to 1 mol percent based on the monomer to be polymerized.

The phosphonium-ylide compound has various other advantages that it is very stable and is not hygroscopic so that it is very easy to handle and is stable for a prolonged period of time.

The polymerization reaction temperature may vary depending on the catalyst concentration and other polymerizing conditions, but is generally in the range of 0 to 150° C., preferably 30 to 120° C.

The polymerization reaction in the presence of the catalyst system of the present invention can be carried out without any solvent and it is also possible to employ a solvent. In any case, the formed polymer precipitates from the reaction system. As for the solvents, there may be used such organic compounds which are inert to the polymerization reaction and do not react with the catalyst. Thus for example there may be used organic solvents inert to the lactone and catalyst, such as chain or cyclic saturated aliphatic hydrocarbons, e.g. n-pentane, n-hexane, cyclohexane, Decalin and dodecane; aromatic hydrocarbons, e.g. benzene, toluene, xylene and tetralin; ethers, e.g. dioxane, tetrahydrofuran, anisole and 1,2-dimethoxyethane; esters, e.g. ethyl acetate, butyl acetate and methyl propionate; ketones, e.g. acetone and methyl ethyl ketone; nitro compounds, e.g. nitrobenzene; and halogenated hydrocarbons, e.g. chlorobenzene, bromobenzene, methylene chloride, 1,2-dichlorethane and trichlorethylene. Generally, such solvent may be used in an amount of 0.1 to 100 parts by weight, preferably 1 to 20 parts by weight per part by weight of the monomer.

The α,α-disubstituted-β-propiolactone to be polymerized in the present invention is represented by the following general formula:

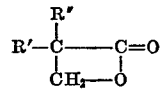

wherein each of R′ and R″ represents an alkyl group of 1 to 4 carbon atoms or a phenyl group.

Examples of these lactones are

α,α-dimethyl-β-propiolactone,
α-methyl-α-ethyl-β-propiolactone,
α-methyl-α-propyl-β-propiolactone,
α-methyl-α-butyl-β-propiolactone,
α,α-diethyl-β-propiolactone,
α-ethyl-α-propyl-β-propiolactone,
α-ethyl-α-butyl-β-propiolactone,
α,α-dipropyl-β-propiolactone,
α-propyl-α-butyl-β-propiolactone,
α,α-dibutyl-β-propiolactone,
α-methyl-α-phenyl-β-propiolactone,
α-ethyl-α-phenyl-β-propiolactone,
α-propyl-α-phenyl-β-propiolactone,
α-butyl-α-phenyl-β-propiolactone or
α,α-diphenyl-β-propiolactone.

One or more of such monomers are polymerized or copolymerized through ring-opening, in the presence of, as a catalyst, a phosphonium-ylide compound having the above indicated bonding form (I).

An oriented fiber having a high crystalinity, tenacity, flexibility and elastic recovery can be obtained by melt-spinning the resulting polymer and stretching the formed filaments. It is also possible to form transparent, tough and stretchable film from said polymer.

The polymerization can be carried out, for example, by using a reactor made of glass or stainless steel and provided with a stirrer which can scrape the reactor wall, a jacket and a reflux condenser.

The invention will be further explained by means of the following examples which are given for illustration purpose only and not for limiting the scope of the present invention. In these examples, the percentages and parts are by weight unless otherwise specified.

EXAMPLE 1

α,α - dimethyl - β - propiolactone of a high purity and n-hexane which has been purified to remove impurities by distillation in the presence of metallic sodium were charged into a flask made of glass and provided with a stirrer and reflux condenser. Then phosphonium-ylide shown in Table 1 was added thereto. The mixture was heated to about 70° C. while being stirred until the reflux of the solvent (n-hexane) occurred and the polymerization reaction was conducted under the reflux of the solvent. After the polymerization, the precipitated polymer was recovered by filtration, washed with methanol and dried at 60° C. under a reduced pressure. The inherent viscosity, molecular weight and melting point of the dried polymer were measured and are shown in Table 1. It will be apparent from Table 1 that various phosphonium-ylides according to the present invention are very effective as catalysts.

The inherent viscosity $\eta_{inh}$ ($= \ln \eta_{rel}/c$) was determined at 30° C. by dissolving the polymer in $CF_3COOH$ to be 0.5%. The molecular weight was calculated by the formula: $\eta_{inh} = 3 \times 10^{-4} \cdot M^{0.8}$ (published Dutch patent application No. 6516566).

TABLE 1

| No. | Amount of monomer (parts) | Amount of hexane (parts) | Catalyst Phosphonium-ylide | Catalyst Amount (mol percent) | Polymerizing time (hrs.) | Polymerization yield, percent | Melting point (° C.) | Inherent viscosity, $\eta_{inh}$ | Molecular weight, M |
|---|---|---|---|---|---|---|---|---|---|
| 1 | 9.08 | 65.1 | $(Ph)_3P^{\oplus}$—$C^{\ominus}HCOPh$ | 0.11 | 2.0 | 100 | 245-253 | 6.20 | 260,000 |
| 2 | 6.60 | 34.8 | $(Ph)_3P^{\oplus}$—$C^{\ominus}HCOCH_3$ | 0.10 | 2.0 | 98.9 | 232-234 | 2.53 | 80,800 |
| 3 | 4.23 | 64.9 | $(Ph)_3P^{\oplus}$—$C^{\ominus}(COPh)_2$ | 0.12 | 13.0 | 56.5 | 218-226 | 1.90 | 56,500 |
| 4 | 6.15 | 41.0 | $(Ph)_3P^{\oplus}$—$C^{\ominus}COOC_2H_5$ | 0.47 | 15.0 | 41.8 | 227-235 | 3.30 | 113,000 |
| 5 | 5.74 | 33.4 | $(Ph)_3P^{\oplus}$—$C^{\ominus}$—COPh  <br> $\quad\quad\quad\quad\quad$ CH$_3$ | 0.087 | 0.5 | 99.8 | 223-226 | 2.52 | 80,400 |
| 6 | 5.00 | 35.4 | $(Ph)_3P^{\oplus}$—$C^{\ominus}HCHO$ | 0.10 | 2.0 | 98.2 | 224-228 | 2.64 | 85,200 |

NOTE.—Ph represents phenyl group

EXAMPLE 2

The results obtained by the use of purified tetrahydrofuran (THF) as a solvent instead of the n-hexane used in Example 1 are shown in Table 2. The polymerization temperature was about 66° C.

TABLE 2

| No. | Amount of monomer (parts) | Amount of THF (parts) | Catalyst Phosphonium-ylide | Catalyst Amount (mol percent) | Polymerizing time (hrs.) | Polymerization yield, percent | Melting point (° C.) | Inherent viscosity, $\eta_{inh}$ | Molecular weight, M |
|---|---|---|---|---|---|---|---|---|---|
| 1 | 4.72 | 20.0 | $(Ph)_3P^{\oplus}$—$C^{\ominus}HCOPh$ | 0.114 | 4.0 | 98.7 | 224-228 | 2.05 | 62,100 |
| 2 | 6.60 | 31.2 | $(Ph)_3P^{\oplus}$—$C^{\ominus}HCHO$ | 0.072 | 4.0 | 97.6 | 219-223 | 1.52 | 42,700 |
| 3 | 4.52 | 22.7 | $(Ph)_3P^{\oplus}$—$C^{\ominus}HCOCH_3$ | 0.097 | 4.0 | 99.1 | 221-226 | 1.88 | 55,800 |

EXAMPLE 3

8.1 parts of α,α-diethyl-β-propiolactone were dissolved in 20 parts of purified benzene and the solution was charged into the same apparatus as in Example 1. Then 0.0305 part (0.127 mol percent on the monomer) of $(Ph)_3P^{\oplus}$—$C^{\ominus}HCOPh$ was added thereto. The mixture was heated at 70° C. for 4 hours under stirring. The obtained polymer was recovered by filtration, washed with methanol and dried under a reduced pressure. There were obtained 8.07 parts of the polymer (polymerization yield 99.6%) having a melting point of 237 to 248° C. and an inherent viscosity $\eta_{inh}$ of 2.23.

EXAMPLE 4

4.75 parts of α,α-dimethyl-β-propionlactone of a high purity and 6.97 parts of n-hexane which has been purified to remove impurities by distillation in the presence of metallic sodium were charged into a flask made of glass and provided with a stirrer and reflux condenser. Further, as a polymerization catalyst, 0.024 part of triphenylphosphonium phenylbenzoylmethylide was added thereto. Then, the mixture was heated (to about 70° C.) while stirring until the reflux of the solvent (n-hexane) occurred. The polymerization was conducted for 2 hours. After the polymerization, the precipitated polymer was recovered by filtration, washed with methanol and dried at 60° C. under a reduced pressure. There was obtained a polymer having a molecular weight of 175,300, melting point of 230.5 to 234.5° C. and inherent viscosity of 4.70 was obtained. The polymerization yield was 97.5%.

What we claim is:

1. A process for producing a high molecular weight polyester which comprises homopolymerizing beta-lactones or copolymerizing mixtures of beta-lactones having the general formula:

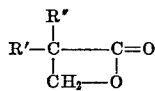

wherein each of R' and R" is an alkyl group having 1 to 4 carbon atoms or a phenyl group, in the presence of a catalyst which is a phosphonium-ylide having the following general formula:

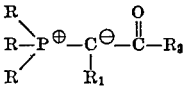

wherein R is a phenyl group, or a phenyl group substituted with substituent(s) selected from the group consisting of an alkyl group of 1 to 6 carbon atoms, a carboalkyl group having 1 to 6 carbon atoms and an alkoxy group of 1 to 6 carbon atoms, $R_1$ is a hydrogen atom, an alkyl group having 1 to 6 carbon atoms, a phenyl group, a benzyl group, a benzoyl group, a carboalkyl group having 1 to 6 carbon atoms, a carboalkoxy group having 1 to 6 carbon atoms, or a phenyl, benzyl or benzoyl group substituted with substituent(s) selected from the group consisting of an alkyl group of 1 to 6 carbon atoms, a carboalkyl group having 1 to 6 carbon atoms and an alkoxy group of 1 to 6 carbon atoms, and $R_2$ is a hydrogen atom, an alkyl group having 1 to 6 carbon atoms, a phenyl group, an alkoxy group having 1 to 6 carbon atoms, or a phenyl group substituted with substituent(s) selected from the group consisting of an alkyl group of 1 to 6 carbon atoms, a carboalkyl group having 1 to 6 carbon atoms and an alkoxy group of 1 to 6 carbon atoms.

2. The process according to claim 1 wherein said phosphonium-ylide is triphenylphosphonium phenacylide, triphenylphosphonium acetylmethylide, triphenylphosphonium dibenzoylmethylide, triphenylphosphonium carboethoxymethylide, triphenylphosphonium methylbenzoylmethylide, formylmethylene triphenylphosphorane, or triphenylphosphonium phenylbenzoyl methylide.

3. The process according to claim 1 wherein said beta lactone is selected from

α,α-dimethyl-β-propiolactone,
α,α-diethyl-β-propiolactone,
α,α-dibutyl-β-propiolactone,
α,α-dipropyl-β-propiolactone,
α-methyl-α-ethyl-β-propiolactone,
α-methyl-α-propyl-β-propiolactone,
α-methyl-α-butyl-β-propiolactone,
α-ethyl-α-propyl-β-propiolactone or
α,α-diphenyl-β-propiolactone.

4. The process according to claim 3 wherein said beta-lactone is α,α-dimethyl-β-propiolactone.

5. The process according to claim 1 wherein said catalyst is employed in an amount of 0.005 to 10% by mol on said lactone to be polymerized.

6. The process according to claim 1 wherein the reaction is carried out at a temperature between 0° C. and 150° C.

7. The process according to claim 1 wherein the reaction is carried out in the presence of a solvent inert to the lactone and catalyst.

8. The process according to claim 7 wherein said solvent is benzene, toluene, xylene, heptane, hexane, tetrahydrofuran or ethyl acetate.

References Cited

UNITED STATES PATENTS

| | | | |
|---|---|---|---|
| 3,518,229 | 6/1970 | Engelhart | 260—64 |
| 3,462,398 | 8/1969 | Wagner et al. | 260—78.3 |

FOREIGN PATENTS

| | | | |
|---|---|---|---|
| 1,128,137 | 9/1968 | Great Britain | 260—78.3 |
| 1,133,294 | 11/1968 | Great Britain | 260—78.3 |

WILLIAM H. SHORT, Primary Examiner

E. A. NIELSEN, Assistant Examiner